(12) United States Patent
Schaeffer (10) Patent No.: US 7,873,445 B2
(45) Date of Patent: Jan. 18, 2011

(54) GOVERNOR FOR A ROTOR WITH A VARIABLE MAXIMUM COLLECTIVE PITCH

(75) Inventor: Joseph Mathew Schaeffer, Cedar Hill, TX (US)

(73) Assignee: Bell Helicopter Textron, Inc., Hurst, TX (US)

( * ) Notice: Subject to any disclaimer, the term of this patent is extended or adjusted under 35 U.S.C. 154(b) by 819 days.

(21) Appl. No.: 11/691,027

(22) Filed: Mar. 26, 2007

(65) Prior Publication Data
US 2008/0243313 A1  Oct. 2, 2008

(51) Int. Cl.
*G05D 1/04* (2006.01)
(52) U.S. Cl. ............................. 701/4; 701/15; 701/16; 244/7 R
(58) Field of Classification Search ............ 701/3, 701/4, 5, 6, 15, 16; 244/7 A, 7 C, 7 R; 416/26
See application file for complete search history.

(56) References Cited

U.S. PATENT DOCUMENTS

| 5,231,823 | A | | 8/1993 | Curran |
| 5,315,819 | A | * | 5/1994 | Page et al. ............... 60/39.282 |
| 6,390,412 | B1 | * | 5/2002 | Stevens .................... 244/17.13 |
| 7,438,259 | B1 | * | 10/2008 | Piasecki et al. ................ 244/6 |
| 7,440,825 | B2 | * | 10/2008 | Einthoven et al. .............. 701/3 |

OTHER PUBLICATIONS

International Preliminary Report on Patentability for PCT International Patent Application No. PCT/US2008/056587, mailed on Sep. 29, 2009.

* cited by examiner

*Primary Examiner*—Thomas G Black
*Assistant Examiner*—Peter D Nolan
(74) *Attorney, Agent, or Firm*—Pillsbury Winthrop Shaw Pittman LLP

(57) ABSTRACT

A governor configured to regulate the rotational velocity of one or more rotors of an aircraft by adjusting a collective blade pitch of the one or more rotors. In one embodiment, the governor comprises a control monitor, a maximum pitch module, a rotor module, and a pitch adjustment module. The control monitor is configured to monitor one or more flight control inputs that are controllable by an operator of the aircraft. The maximum pitch module is configured to dynamically determine a maximum collective blade pitch based on the one or more flight control inputs monitored by the control monitor. The rotor module is configured to monitor information related to the rotational velocity of the one or more rotors. The pitch adjustment module is configured to (i) receive information related to the rotational velocity of the one or more rotors from the rotor module and (ii) adjust the collective blade pitch of the one or more rotors to regulate the rotational velocity of the one or more rotors.

18 Claims, 4 Drawing Sheets

GOVERNOR FOR A ROTOR WITH A VARIABLE MAXIMUM COLLECTIVE PITCH

FIELD OF THE INVENTION

The invention relates to governors of rotors, such as aircraft rotors, that regulate rotational velocity by varying the collective blade pitch of the rotors.

BACKGROUND OF THE INVENTION

In the aircraft industry, particularly in rotorcraft, propeller airplanes, and tiltrotorcraft, the use of a governor to regulate the rotational velocity of one or more rotors is known. Generally, these governors adjust the collective blade pitch of the rotors to regulate the rotational velocity of the one or more rotors while at the same time providing differing degrees of thrust. However, during some types of aircraft malfunctions, such as "high-side failures," these conventional governors may cause aircraft to unexpectedly change altitude or liftoff.

SUMMARY

One aspect of the invention relates to a governor configured to regulate the rotational velocity of one or more rotors of an aircraft by adjusting a collective blade pitch of the one or more rotors. In one embodiment, the governor comprises a control monitor, a maximum pitch module, a rotor module, and a pitch adjustment module. The control monitor is configured to monitor one or more flight control inputs that are controllable by an operator of the aircraft. The maximum pitch module is configured to dynamically determine a maximum collective blade pitch based on the one or more flight control inputs monitored by the control monitor. The rotor module is configured to monitor information related to the rotational velocity of the one or more rotors. The pitch adjustment module is configured to (i) receive information related to the rotational velocity of the one or more rotors from the rotor module and (ii) adjust the collective blade pitch of the one or more rotors to regulate the rotational velocity of the one or more rotors, wherein the pitch adjustment module is constrained by the determined maximum collective blade pitch determined by the maximum pitch module such that as the pitch adjustment module adjusts the collective blade pitch of the one or more rotors the collective blade pitch remains below the maximum collective blade pitch.

Another aspect of the invention relates to a flight control system that controls an aircraft. In one embodiment, the flight control system comprises an operator interface and a governor. The operator interface is configured to enable an operator of the aircraft to control one or more flight control inputs that dictate one or more aspects of the operation of the aircraft. The governor is configured to regulate the rotational velocity of one or more rotors of the aircraft by adjusting a collective blade pitch of the one or more rotors. The governor comprises a control monitor, a maximum pitch module, a rotor module, and a pitch adjustment module. The control monitor is configured to monitor the operator interface to determine information related to the control of the one or more flight control inputs by the operator of the aircraft. The maximum pitch module is configured to dynamically determine a maximum collective blade pitch based on the information related to the control of the one or more flight control inputs determined by the control monitor. The rotor module is configured to monitor information related to the rotational velocity of the one or more rotors. The pitch adjustment module is configured to (i) receive information related to the rotational velocity of the one or more rotors from the rotor module and (ii) adjust the collective blade pitch of the one or more rotors to regulate the rotational velocity of the one or more rotors, wherein the pitch adjustment module is constrained by the determined maximum collective blade pitch determined by the maximum pitch module such that as the pitch adjustment module adjusts the collective blade pitch of the one or more rotors the collective blade pitch remains below the maximum collective blade pitch.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
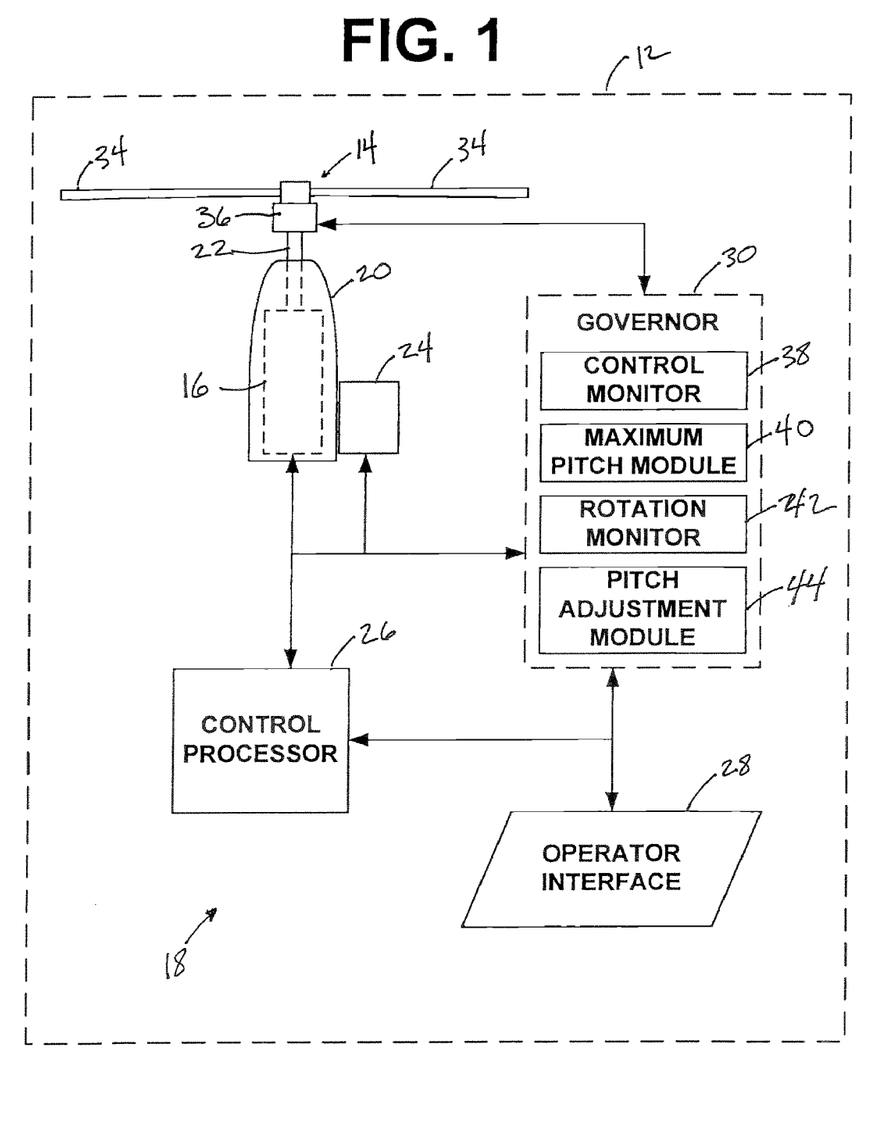
FIG. 1 is a schematic diagram of an aircraft, according to one or more embodiments of the invention.

FIG. 1 is a schematic diagram of an aircraft (represented schematically in FIG. 1 by dashed line 12), according to one or more embodiments of the invention. Aircraft 12 includes at least one rotor 14 that rotates to provide a thrust that propels aircraft 12. The at least one rotor 14 is driven rotationally by at least one motor 16. Aircraft 12 includes a flight control system 18 configured to control aircraft 12 generally, and more particularly to alleviate the impact of a high-side failure of one or more of the at least one motor 16. For example, flight control system 18 may adjust one or more of the aspects of the operation of aircraft 12 during a high-side failure such that the thrust generated by rotor 14 during the high-side failure is not sufficient to cause aircraft 12 (or a portion of aircraft 12) to lift-off.

In one embodiment, aircraft 12 is a tiltrotor aircraft in which a mast angle of rotor 14 is adjustable, thereby enabling rotor 14 to be selectively positioned such that thrust generated by rotor 14 provides lift (e.g., similar to the rotor of a helicopter), or propels aircraft 12 in a horizontal direction (e.g., similar to a turboprop, fixed wing aircraft). In this embodiment, aircraft 12 includes at least one nacelle 20 that houses motor 16 and/or other components of aircraft 12. A drive shaft 22 that is driven by motor 16 protrudes from nacelle 20, and rotor 14 is mounted to drive shaft 22 such that rotation of drive shaft 22 by motor 16 causes rotor 14 to rotate. In order to enable the mast angle of rotor 14 to be adjusted, aircraft 12 includes at least one nacelle actuator 24 that pivots nacelle 20 with respect to the body of aircraft 12 to change the mast angle of rotor 14. As used herein, the term "mast angle" represents an angle between an axis of rotation of rotor 14 (e.g., drive shaft 22), or the "mast" of rotor 14, and a longitudinal axis of the body of aircraft 12 (parallel to the ground when aircraft 12 is on the ground).

Although some of the aspects of the invention are described herein with respect to a tiltrotor aircraft, this is not intended to be limiting. For example, from the description provided herein it should be apparent that in one embodiment, aircraft 12 is a rotorcraft (e.g., a helicopter) that provides for relatively limited adjustments to the mast angle of rotor 14.

In one embodiment, flight control system 18 includes a control processor 26, an operator interface 28, and a governor 30. Control processor 26 coordinates control over various components of aircraft 12 (e.g., motor 16, nacelle actuator 24, ailerons (not shown), landing gear (not shown), operator interface 28, etc.). For instance, control processor 26 may include a Full Authority Digital Electronics Control ("FADEC"), a Flight Control Computer ("FCC"), and/or other control processors configured to coordinate control over one or more components of aircraft 12. It should be appreciated that although control processor 26 is shown in FIG. 1 as a single entity, this is for illustrative purposes only. In some implementations, control processor 26 may include a plurality of separate processors. These processors may be physically located within the same device (e.g., within a single console in aircraft 12), or control processor 26 may represent the processing functionality of a plurality of devices operating in coordination within aircraft 12. In instances in which a plurality of devices are implemented, operative communications links may be formed between the devices to enable communication and coordination therebetween.

Operator interface 28 provides an interface between one or more operators of aircraft 12 and control processor 26 to enable information to be exchanged between the one or more operators and control processor 26. Operator interface 28 includes one or more input devices that enable the one or more operators to control one or more flight control inputs that dictate one or more aspects of the operation of aircraft 12. For example, operator interface 28 may include one or more sticks, one or more switches, one or more steering wheels, one or more knobs, one or more buttons, one or more keypads, and/or other input devices. Operator interface 28 also includes one or more information output devices that convey information related to the operation of aircraft 12 to the one or more operators. For instance, operator interface 28 may include one or more displays, one or more auditory devices, one or more lights, one or more visual indicia, and/or other information output devices.

In particular, in one embodiment, operator interface 28 includes a mast control input device. The mast control input device enables the operator to control the mast angle of rotor 14. For example, the operator may set the mast angle to about 90° to enable aircraft 12 to accomplish vertical take-offs and/or landings, or to hover. As another example, the operator may set the mast angle to about 0° to enable aircraft 12 to fly horizontal distances with an enhanced efficiency in comparison with larger mast angles. In operation, as the operator adjusts the mast angle via the mast control input device, the adjustment is communicated to control processor 26 through a communication link between operator interface 28 and control processor 26. Based on the adjustment received by control processor 26 from operator interface 28, control processor 26 controls nacelle actuator 24 to position nacelle 20 to provide the mast angle dictated by the operator via operator interface 28.

In one embodiment, operator interface 28 includes a thrust control input device. The thrust control input device enables the operator to control the amount of thrust generated by rotor 14. The impact of increasing or decreasing the thrust generated by rotor 14 may vary based on the mast angle of rotor 14. For instance, if the mast angle of rotor 14 is about 90°, the thrust generated by rotor 14 provides lift that propels aircraft 12 upwards. If the mast angle of rotor 14 is about 0°, the thrust generated by rotor 14 propels aircraft 12 forward through the air. In operation, as the operator adjusts the thrust to be generated by rotor 14 via the thrust control input device, the adjustment is communicated to control processor 26 through the communication link between operator interface 28 and control processor 26. Based on the adjustment received by control processor 26 from operator interface 28, control processor 26 controls the power generated by motor 16 (used to drive rotor 14). For example, if the operator increases the thrust of rotor 14 via the thrust control input device, control processor 26 increases the power generated by motor 16. It should be appreciated that assuming all of the other aspects of rotor 14 are unchanged, an increase in the power generated by motor 16 causes an increase in the rotational velocity of rotor 14, and a corresponding increase in the thrust generated by rotor 14. Similarly, if the operator decreases the thrust of rotor 14 via the thrust control input device, control processor 26 decreases the power generated by motor 16, which (assuming the other aspects of rotor 14 are unchanged) causes a decrease in the rotational velocity of rotor 14.

As the power generated by motor 16 increases and decreases (e.g., in accordance with the control of the one or more operators), governor 30 operates to regulate the rotational velocity of rotor 14. For example, governor 30 may control one or more aspects of the operation of rotor 14 to ensure that the rotational velocity of rotor 14 remains between an upper rotational velocity threshold and a lower rotational velocity threshold. As another example, governor 30 may control one or more aspects of the operation of rotor 14 to ensure that the rotational velocity remains substantially equal to target rotational velocity.

In one embodiment, rotor 14 includes one or more blades 34, and the one or more aspects of the operation of rotor 14 that are controlled by governor 30 includes a collective blade pitch of rotor 14. In this embodiment, aircraft 12 includes at least one collective pitch actuator 36 that adjusts the collective blade pitch of rotor 14. It should be appreciated that the term "collective blade pitch" refers to the blade pitch of all of the blades 34 of rotor 14. It should further be appreciated that the representation of collective pitch actuator 36 in the drawings is merely schematic and that the disclosure contemplates that any mechanism suitable for actuating blades 34 to adjust the collective pitch thereof may be implemented as collective pitch actuator 36.

Figures 2A, 2B:
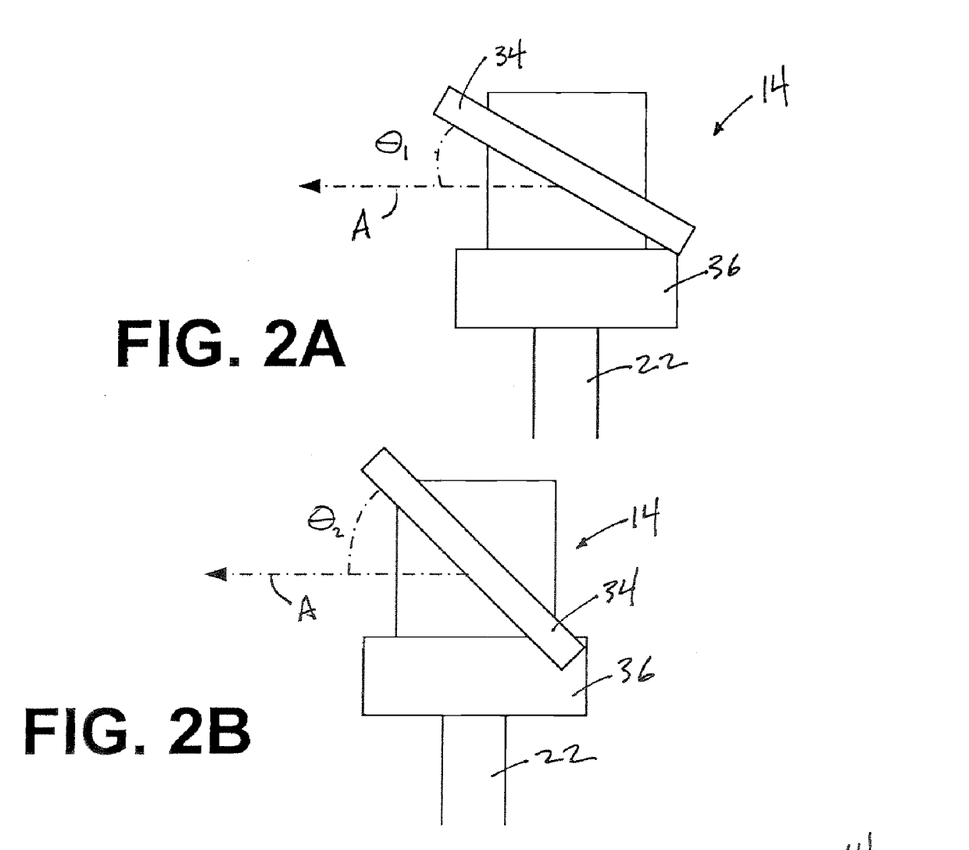
FIGS. 2A-2C illustrate the operation of a governor and a collective pitch actuator in regulating the rotational velocity of a rotor, in accordance with one or more embodiments of the invention.
Figure 2C:
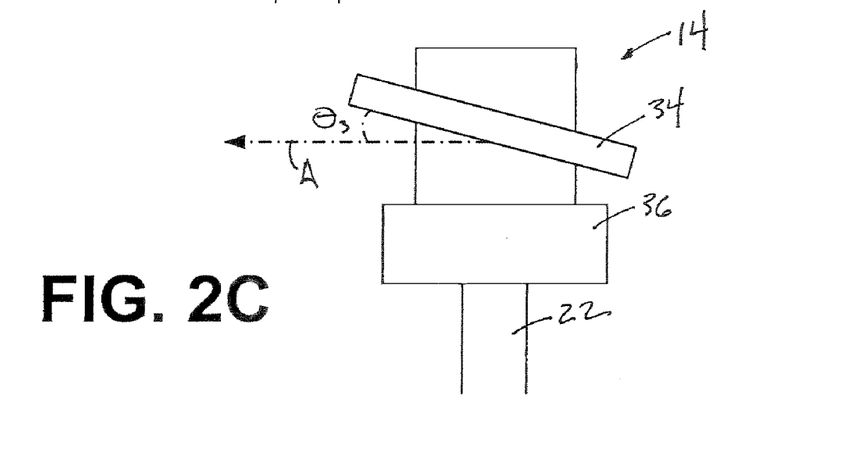

FIGS. 2A-2C illustrate the operation of governor 30 and collective pitch actuator 36 in regulating the rotational velocity of rotor 14. At a first moment in time, rotor 14 is providing a first amount of thrust. FIG. 2A illustrates one of blades 34, positioned at a first collective blade pitch $\theta_1$, at the first moment in time. As can be seen in FIG. 2A, the blade pitch may be defined as the angle between the cross-section of the blade 34 and the plane of the rotational path of the blade 34 (denoted by the dashed line A in FIG. 2A).

At a second moment in time, the operator may input an adjustment of the amount of thrust to be generated by rotor 14 via operator interface 28 to increase the amount of thrust generated by rotor 14. Based on the input of the operator, the power generated by motor 16 that rotates rotor 14 is increased (e.g., by control processor 26, as was discussed above). This increase in power tends to increase the rotational velocity of rotor 14 subsequent to the second moment in time, provided the other aspects of the operation of rotor 14 are held constant. However, governor 30 detects this increase in the rotational velocity of rotor 14 (e.g., based on information determined by rotation monitor 42 as discussed below) and controls collective pitch actuator 36 to adjust the collective blade pitch of blades 34 to regulate the rotational velocity of rotor 14. For example, governor 30 may increase the collective blade pitch from the first collective blade pitch $\theta_1$ to a second collective blade pitch $\theta_2$ illustrated in FIG. 2B. As can be seen in FIG. 2B, second collective blade pitch $\theta_2$ is greater than first collective blade pitch $\theta_1$. Therefore, positioned at second collective blade pitch $\theta_2$ blades 34 encounter greater resistances as they move through the air, which slows the rotational velocity of rotor 14 while still providing an increased amount of thrust.

Similarly, at a third moment in time, the operator may input an adjustment of the amount of thrust generated by rotor 14 to reduce the amount of thrust generated by rotor 14 to less than the thrust that was being generated by rotor 14 at the first moment in time. In response to this adjustment, the power generated by motor 16 used to rotate rotor 14 is decreased (e.g., by control processor 26, as was discussed above). Due to the reduction in power generated by motor 16, the rotational velocity of rotor 14 also decreases. Governor 30 then responds to the reduction in rotational velocity by again controlling collective pitch actuator 36 to adjust the collective blade pitch of blades 34, this time changing the collective blade pitch to a third collective blade pitch $\theta_3$, shown in FIG. 2C, that is less than first collective blade pitch $\theta_1$. Even with the reduced power generated by motor 16 subsequent to the third moment in time, the reduced angle of the third collective blade pitch $\theta_3$ enables the rotational velocity of rotor 14 to remain at or near the rotational velocity of rotor 14 at the first moment in time.

This adjustment of the collective blade pitch by governor 30 to regulate the rotational velocity of rotor 14 is effective in providing differing amounts of thrust (based on operator input) while maintaining a relatively continuous rotational velocity. However, in some instances, conventional governors that operate according to this principle may compound other system failures within flight control system 18. For example, various conditions may give rise to a "high-side failure," in which motor 16 is given a faulty command from control processor 26 to generate too much power (e.g., more power than is dictated by the input of the operator via operator interface 28). In such an instance, a conventional governor would continue to regulate the rotational velocity of rotor 14 by adjusting the collective blade pitch of rotor 14 as discussed above, which would result in the generation of undesired thrust. In instances in which aircraft 12 is positioned for a vertical take-off (e.g., on a landing pad with a mast angle of about 90°) this increase in thrust may result in an undesired lift-off. In instances in which aircraft 12 is hovering or ascending/descending vertically, particularly at a relatively low altitude, the increase in thrust caused by a conventional governor may cause an unanticipated, relatively sudden change in altitude (e.g., an increase in altitude). During forward flight (e.g., with a mast angle of substantially less than 90°) the thrust created by a conventional governor during a "high-side failure" may cause an anticipated increase in airspeed.

Returning to FIG. 1, governor 30 is designed to moderate the impact of a "high-side failure" by flight control system 18. Governor 30 may include one or more processors capable of executing algorithms and/or operations to regulate the rotational velocity of rotor 14. For example, governor 30 may include one or more microprocessors, one or more circuits, one or more state machines, one or more analog computers, one or more sensors, and/or other devices or arrangements capable of executing algorithms and/or operations. In one embodiment, some or all of the components of governor 30 may be implemented in processor 26. Conversely, some or all of the components of governor 30 may be implemented in one or more processors separate from control processor 26.

As is shown in FIG. 1, in one embodiment, governor 30 includes a control monitor 38, a maximum pitch module 40, a rotation monitor 42, and a pitch adjustment module 44. Monitor 38, module 40, monitor 42, and/or module 44 may be implemented in software; hardware; firmware; some combination of software, hardware, and/or firmware; and/or otherwise implemented. In implementations in which governor 30 includes multiple processors, monitor 38, module 40, monitor 42, and/or module 44 may be located remotely from the other ones of monitor 38, module 40, monitor 42, and/or module 44, and operative communication between monitor 38, module 40, monitor 42, and/or module 44 may be achieved via one or more communication links. Such communication links may be wireless or hard wired.

Control monitor 38 is configured to monitor one or more flight control inputs that are controllable by the operator of aircraft 12. This includes monitoring one or more flight control inputs that are controllable by the operator via operator interface 28. In one embodiment, control monitor 38 may receive information related to the one or more flight control inputs from a sensor located at or near operator interface 28 that detects information related to one or more flight control input devices associated with operator interface 28. In one embodiment, control monitor 38 may receive information related to the one or more flight control inputs from operator interface 28 itself. For example, signals communicated from operator interface 28 to control processor 26 to communicate the control and/or adjustment of the flight control inputs by the operator from operator interface 28 to control processor 26 may be sent as well to control monitor 38. In one embodiment, the one or more flight control inputs that are monitored by control monitor 38 include one or both of a mast angle control input (e.g., input via a mast angle control input device) and a thrust control input (e.g., input via a thrust control input device).

Maximum pitch module 40 is configured to dynamically determine a maximum collective blade pitch. The maximum collective blade pitch is the greatest collective blade pitch to which governor 30 can adjust the collective blade pitch of blades 34 to regulate the rotational velocity of rotor 14 (e.g., as discussed above). By maintaining the collective blade pitch of blades 34 below some threshold (e.g., the dynamically determined maximum collective blade pitch), the rotational velocity of rotor 14 may be permitted to increase to a higher rate than if the collective blade pitch is not constrained below the threshold as the power generated by motor 16 increases (e.g., during a high-side failure). However, the corresponding amount of thrust generated by rotor 14 is reduced by keeping the collective blade pitch below the threshold as the power generated by motor 16 continues to increase.

In one embodiment, maximum pitch module 40 determines the maximum collective blade pitch based on the one or more flight control inputs monitored by control monitor 38. In particular, maximum pitch module 40 may reduce the maximum collective blade pitch in instances in which the monitored one or more flight control inputs indicate that aircraft 12 is in a position and/or configuration that may leave aircraft 12 and/or the operators (or passengers) of aircraft 12 vulnerable to the effects of an error (e.g., by control processor 26 and/or motor 16) resulting in the generation of excessive thrust by rotor 12, such as a "high-side failure."

In one embodiment, the maximum collective blade pitch is reduced in instances in which the one or more monitored one or more flight control inputs indicate that aircraft 12 is on the ground (or some other surface) or is hovering close to the ground (or some other surface). For example, since the mast angle dictated by the operator when aircraft 12 is on the ground (or some other surface) or is hovering close to the ground (or some other surface) is typically close to 90°, maximum pitch module 40 may reduce the maximum collective blade pitch as the mast angle dictated by the operator via the mast angle control input of operator interface 28 increases. Thus, as the mast angle dictated by the operator via operator interface 28 becomes closer to 90°, the maximum collective blade pitch becomes lower. By manipulating the maximum collective blade pitch in this manner, maximum pitch module 40 reduces the unwanted thrust that will be experienced by aircraft 12 during, for example, a high-side failure. This may reduce an unexpected gain in altitude accompanying such a failure, and/or avoid an unexpected take-off if aircraft 12 is on the ground (or some other surface) at the time of the failure.

As another example, the amount thrust dictated by the operator, via the thrust control input of operator interface 28, when aircraft 12 is on the ground (or some other surface) or is hovering close to the ground (or some other surface) is relatively low in comparison with other operating conditions (e.g., hovering at altitude, horizontal flight, etc.). Accordingly, in one embodiment, maximum pitch module 40 reduces the maximum collective blade pitch when the amount of thrust dictated by the operator (as opposed to the amount of thrust actually produced during a failure or other error) is relatively low. This may reduce an unexpected gain in thrust caused by a "high-side failure" in instances in which the thrust dictated by the operator is relatively low, while increasing the maximum collective blade pitch as the thrust dictated by the operator increases enables governor 30 to adequately adjust the collective blade pitch of blades 34 to maintain regulation of the rotational velocity of rotor 14 and still accommodate the increased thrust dictated by the operator.

In one embodiment, the collective blade pitch at which aircraft 12 is lifted by the maximum power that can be generated by motor 16 is determined. In such an embodiment, maximum pitch module 40 receives information related to a thrust control input that is input via operator interface 28. If the thrust control input corresponds to a thrust above a thrust threshold, maximum pitch module 40 sets the maximum collective pitch at (or just below) the determined collective blade pitch at which aircraft 12 is lifted by the maximum power that can be generated by motor 16. If the thrust control input corresponds to a thrust below the thrust threshold, maximum pitch module 40 does not set a maximum collective pitch that will not substantially restrict adjustment of the collective blade pitch. The thrust threshold corresponds to the thrust control input associated with pilot commanded takeoff of aircraft 12 (this may vary based on other flight control inputs, such as a mast angle control input).

Rotation monitor 42 is configured to monitor information related to the rotational velocity of rotor 14. This may include a rotational orientation of rotor 14, a rotational orientation of drive shaft 22 of motor 16, a rotational velocity of rotor 14, a rotational velocity of drive shaft 22 of motor 16, or other information related to the rotational velocity of rotor 14. In one embodiment, rotation monitor 42 includes a standalone sensor device that electronically and/or mechanically detects information related to the rotational velocity of rotor 14 at or near rotor 14 or motor 16 (e.g., an RPM sensor, a position sensor, etc.). In another embodiment, rotation monitor 42 may include a module that operates within control processor 26 to detect control information received by control processor 26 from motor 16. In another embodiment, rotation monitor may communicate with a component of motor 16 that provides information related to the rotational velocity of the motor 16/rotor 14 system (e.g., a motor encoder, etc.).

Pitch adjustment module 44 is configured to control the collective blade pitch of blades 34 of rotor 14. This includes adjusting the collective blade pitch of blades 34 to regulate the rotational velocity of rotor 14 (e.g., as discussed above with respect to FIGS. 2A-2C). In one embodiment, pitch adjustment module 44 receives information related to the rotational velocity of rotor 14 from rotation monitor 42. Based on the received information, pitch adjustment module 44 may adjust the collective blade pitch of blades 34 to regulate the rotational velocity of rotor 14. However, pitch adjustment module 44 also receives the maximum collective blade pitch from maximum pitch module 40, and pitch adjustment module 44 is constrained such that any adjustments to the collective blade pitch of blades 34 leaves the collective blade pitch below the maximum collective blade pitch determined by maximum pitch module 44.

Figure 3:
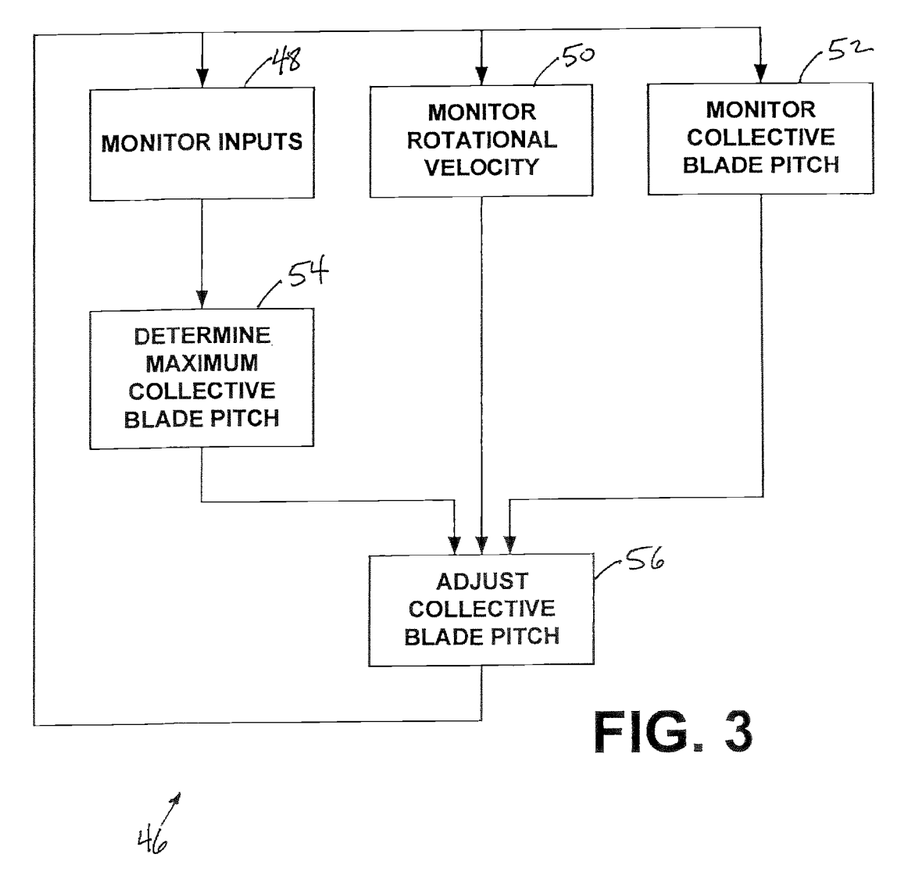
FIG. 3 includes a flow chart that illustrates a method of regulating a rotational velocity of one or more rotors of an aircraft, in accordance with one or more embodiments of the invention.

FIG. 3 includes a flow chart that illustrates a method 46 of regulating a rotational velocity of one or more rotors of an aircraft, in accordance with one embodiment of the invention. It should be appreciated that although specific reference is made below regarding various operations of method 46 that can be executed by components of aircraft 12 (e.g., illustrated in FIG. 1 and described above), this is for illustrative purposes only. In other embodiments, aircraft other than aircraft 12 may be implemented to execute some or all of the operations of method 46.

Method 46 includes an operation 48 at which one or more flight control inputs are monitored. The one or more flight control inputs are controllable by an operator of the aircraft. In one embodiment, the one or more flight control inputs are controlled by the operator via an operator interface similar to operator interface 28 (shown in FIG. 1 and described above). In one embodiment, the one or more flight control inputs are monitored by a control monitor similar to control monitor 38 (shown in FIG. 1 and described above).

At an operation 50, a current collective blade pitch of the blades of the one or more rotors is monitored. The current collective blade pitch of the blades of the one or more rotors may be monitored by a pitch adjustment module configured to adjust the collective blade pitch of the blades. For example, in one embodiment, the collective blade pitch of the blades of the one or more rotors may be monitored by a pitch adjustment module similar to pitch adjustment module 44 (shown in FIG. 1 and described above).

At an operation 52, information related to the rotational velocity of the one or more rotors is monitored. In one embodiment, operation 52 may be executed by a rotation monitor similar to rotation monitor 38 (shown in FIG. 1 and described above).

At an operation 54, a maximum collective blade pitch based on the one or more flight control inputs monitored at operation 48. In one embodiment, the maximum collective blade pitch may be determined at operation 54 by a maximum pitch module in a manner similar to the manner in which maximum pitch module 40 (shown in FIG. 1 and described above) determines the maximum collective blade pitch.

At an operation 56, the collective blade pitch of the one or more rotors is adjusted to regulate the rotational velocity of the one or more rotors. The adjustment of collective blade pitch at operation 56 is constrained such that the collective blade pitch of the one or more rotors remains below the maximum collective blade pitch determined at operation 54. In one embodiment, operation 56 is executed by a pitch adjustment module similar to pitch adjustment module 44 (shown in FIG. 1 and described above).

Figure 4:
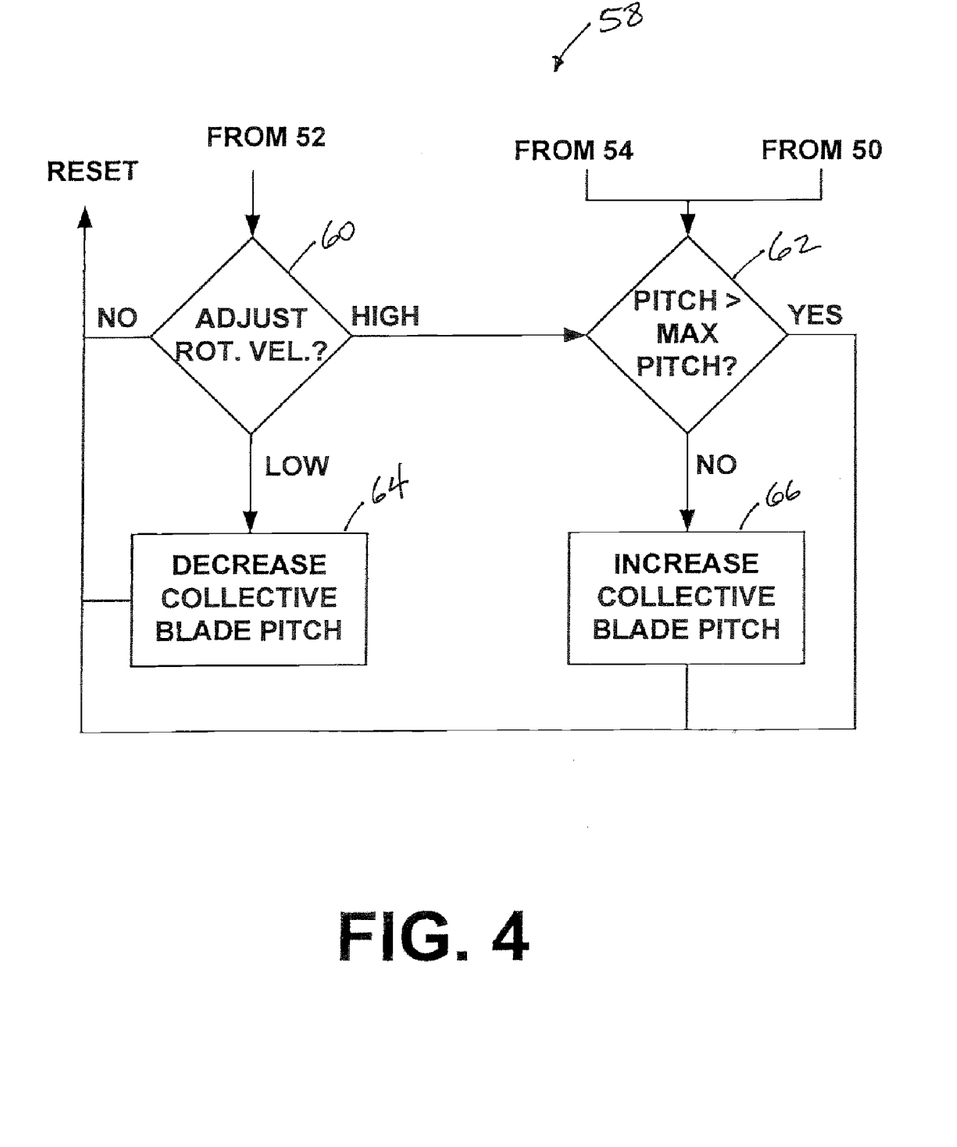
FIG. 4 includes a flow chart that illustrates a method of adjusting a collective blade pitch of one or more rotors of an aircraft, according to one or more embodiments of the invention.

FIG. 4 includes a flow chart that illustrates a method 58 of adjusting a collective blade pitch of one or more rotors of an aircraft, in accordance with one embodiment of the invention. It should be appreciated that although specific reference is made below regarding various operations of method 58 that can be executed by components of aircraft 12 (e.g., illustrated in FIG. 1 and described above), this is for illustrative purposes only. In other embodiments, aircraft other than aircraft 12 may be implemented to execute some or all of the operations of method 58. In one embodiment, method 58 may be implemented as operation 56 of method 46 (shown in FIG. 2 and described above). However, in other embodiments, method 58 may be used separate from method 46. Method 58 may be performed by a pitch adjustment module similar to pitch adjustment module 44 (shown in FIG. 1 and described above).

Method 58 includes an operation 60 at which a determination is made as to whether a current rotational velocity of the one or more rotors needs adjustment. In one embodiment, operation 60 may include comparing a current rotational velocity (e.g., from information provided by operation 52, shown in FIG. 2 and described above) with a range of acceptable rotational velocities. In one embodiment, this includes a range between an upper threshold and a lower threshold and, if the current rotational velocity is not within the range, determining that the rotational velocity needs adjustment. In another embodiment, this includes comparing the current rotational velocity to a target velocity and, if the current rotational velocity is sufficiently different from the current rotational velocity, determining that the rotational velocity needs adjustment. If it is determined at operation 60 that no adjustment of the rotational velocity is needed, then method 58 resets. This may include returning to operation 60, or returning to an operation of a method of which method 58 is a part (e.g., returning to operations 48, 50, and 52 of method 46 where method 58 is included in method 46 as operation 56). If it is determined at operation 60 that adjustment of the rotational velocity is needed because the current rotational velocity is too high, then method 58 proceeds to an operation 62. If it is determined at operation 60 that adjustment of the rotational velocity is needed because the current rotational velocity is too low, then method 58 proceeds to an operation 64.

At operation 62, a comparison is made between the current collective blade pitch of the one or more rotors and a maximum collective blade pitch. The maximum collective blade pitch may be a dynamically determined blade pitch (e.g., as is determined at operation 54 shown in FIG. 2 and described above). If the current collective blade pitch of the one or more rotors does not exceed the maximum collective blade pitch, then method 58 proceeds to an operation 66 at which the collective blade pitch of the one or more rotors is increased to reduce the rotational velocity of the one or more rotors. From operation 66, method 58 resets (e.g., as was discussed above). If the current collective blade pitch does exceed the maximum collective blade pitch, then method 58 resets without adjusting the current collective blade pitch.

At operation 64, the collective blade pitch of the one or more rotors is decreased. The decrease in the collective blade pitch of the one or more rotors causes the rotational velocity of the one or more rotors to increase. From operation 66, method 58 resets (e.g., as was discussed above).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A governor configured to regulate the rotational velocity of one or more rotors of an aircraft by adjusting a collective blade pitch of the one or more rotors, the governor comprising:
   a control monitor configured to monitor one or more flight control inputs that are controllable by an operator of the aircraft;
   a maximum pitch module configured to dynamically determine a maximum collective blade pitch based on the one or more flight control inputs monitored by the control monitor;
   a rotor module configured to monitor information related to the rotational velocity of the one or more rotors; and
   a pitch adjustment module configured to (i) receive the information related to the rotational velocity of the one or more rotors from the rotor module and (ii) adjust the collective blade pitch of the one or more rotors to regulate the rotational velocity of the one or more rotors, wherein the pitch adjustment module is constrained by the determined maximum collective blade pitch determined by the maximum pitch module such that as the pitch adjustment module adjusts the collective blade pitch of the one or more rotors the collective blade pitch remains below the maximum collective blade pitch.

2. The governor of claim 1, wherein the one or more flight control inputs monitored by the control module comprise a flight control input that dictates a mast angle of the one or more rotors.

3. The governor of claim 2, wherein the maximum pitch module is configured to determine the maximum pitch amount such that the maximum pitch amount has an inversely proportional relationship with the mast angle dictated by the flight control input that dictates the mast angle of the one or more rotors.

4. The governor of claim 1, wherein the one or more flight control inputs monitored by the control module comprise a flight control input that dictates a thrust generated by the one or more rotors.

5. The governor of claim 4, wherein the maximum pitch module is configured to determine the maximum pitch amount such that the maximum pitch amount has a directly proportional relationship with the thrust dictated by the flight control input that dictates the thrust generated by the one or more rotors.

6. The governor of claim 1, wherein the one or more flight control inputs monitored by the control module comprise a flight control input that dictates a mast angle of the one or more rotors and a flight control input that dictates a thrust generated by the one or more rotors.

7. A flight control system that controls an aircraft, the flight control system comprising:
- an operator interface configured to enable an operator of the aircraft to control one or more flight control inputs that dictate one or more aspects of the operation of the aircraft; and
- a governor configured to regulate the rotational velocity of one or more rotors of the aircraft by adjusting a collective blade pitch of the one or more rotors, the governor comprising:
- a control monitor configured to monitor the operator interface to determine information related to the control of the one or more flight control inputs by the operator of the aircraft;
- a maximum pitch module configured to dynamically determine a maximum collective blade pitch based on the information related to the control of the one or more flight control inputs determined by the control monitor;
- a rotor module configured to monitor information related to the rotational velocity of the one or more rotors;
- a pitch adjustment module configured to (i) receive the information related to the rotational velocity of the one or more rotors from the rotor module and (ii) adjust the collective blade pitch of the one or more rotors to regulate the rotational velocity of the one or more rotors, wherein the pitch adjustment module is constrained by the determined maximum collective blade pitch determined by the maximum pitch module such that as the pitch adjustment module adjusts the collective blade pitch of the one or more rotors the collective blade pitch remains below the maximum collective blade pitch.

8. The flight control system of claim 7, wherein the information related to the control of the one or more flight control inputs determined by the control monitor comprises information related to a mast angle of the one or more rotors dictated by the one or more flight control inputs controlled by the operator.

9. The flight control system of claim 8, wherein the maximum pitch module is configured to determine the maximum pitch amount such that the maximum pitch amount has an inversely proportional relationship with the mast angle of the one or more rotors dictated by the one or more flight control inputs controlled by the operator.

10. The flight control system of claim 7, wherein the information related to the control of the one or more flight control inputs determined by the control monitor comprises information related to a thrust generated by the one or more rotors that is dictated by the one or more flight control inputs controlled by the operator.

11. The flight control system of claim 10, wherein the maximum pitch module is configured to determine the maximum pitch amount such that the maximum pitch amount has a directly proportional relationship with the thrust generated by the one or more rotors that is dictated by the one or more flight control inputs controlled by the operator.

12. The flight control system of claim 7, wherein the information related to the control of the one or more flight control inputs determined by the control monitor comprises (i) information related to a mast angle of the one or more rotors dictated by the one or more flight control inputs controlled by the operator, and (ii) information related to a thrust generated by the one or more rotors that is dictated by the one or more flight control inputs controlled by the operator.

13. A method of regulating a rotational velocity of one or more rotors of an aircraft, the method comprising:
- monitoring one or more flight control inputs that are controllable by an operator of the aircraft;
- determining a maximum collective blade pitch based on the monitored one or more flight control inputs;
- adjusting the collective blade pitch of the one or more rotors to regulate the rotational velocity of the one or more rotors, wherein the adjustment of the collective blade pitch of the one or more rotors is constrained by the determined maximum collective blade pitch determined by a maximum pitch module such that the collective blade pitch of the one or more rotors remains below the maximum collective blade pitch.

14. The method of claim 13, wherein the one or more flight control inputs that are monitored comprise a flight control input that dictates a mast angle of the one or more rotors.

15. The method of claim 14, wherein the maximum pitch amount is determined such that it has an inversely proportional relationship with the mast angle dictated by the flight control input that dictates the mast angle of the one or more rotors.

16. The method of claim 13, wherein the one or more flight control inputs that are monitored comprise a flight control input that dictates a thrust generated by the one or more rotors.

17. The method of claim 16, wherein the maximum pitch amount is determined such that it has a directly proportional relationship with the thrust dictated by the flight control input that dictates the thrust generated by the one or more rotors.

18. The method of claim 13, wherein the one or more flight control inputs that are monitored comprise a flight control input that dictates a mast angle of the one or more rotors and a flight control input that dictates a thrust generated by the one or more rotors.

* * * * *